(12) United States Patent
Zhodzishsky et al.

(10) Patent No.: US 11,067,703 B2
(45) Date of Patent: Jul. 20, 2021

(54) SHADOW RECOVERY OF A SINGLE SATELLITE SIGNAL IN A GNSS RECEIVER

(71) Applicant: Topcon Positioning Systems, Inc., Livermore, CA (US)

(72) Inventors: Mark I. Zhodzishsky, Moscow (RU); Victor A. Veitsel, Moscow (RU); Alexey S. Lebedinskiy, Moscow (RU); Roman V. Kurynin, Moscow (RU)

(73) Assignee: Topcon Positioning Inc., Livermore, CA (US)

( * ) Notice: Subject to any disclaimer, the term of this patent is extended or adjusted under 35 U.S.C. 154(b) by 363 days.

(21) Appl. No.: 15/760,127

(22) PCT Filed: Nov. 2, 2017

(86) PCT No.: PCT/RU2017/000816
§ 371 (c)(1),
(2) Date: Mar. 14, 2018

(87) PCT Pub. No.: WO2019/088866
PCT Pub. Date: May 9, 2019

(65) Prior Publication Data
US 2019/0129043 A1    May 2, 2019

(51) Int. Cl.
*G01S 19/26* (2010.01)
*G01S 19/35* (2010.01)
(Continued)

(52) U.S. Cl.
CPC .............. *G01S 19/26* (2013.01); *G01S 19/21* (2013.01); *G01S 19/22* (2013.01); *G01S 19/35* (2013.01)

(58) Field of Classification Search
CPC .......... G01S 19/21; G01S 19/22; G01S 19/26; G01S 19/29
See application file for complete search history.

(56) References Cited

U.S. PATENT DOCUMENTS

| 5,914,685 A | 6/1999 | Kozlov et al. |
| 7,495,607 B1 * | 2/2009 | Zhodzishsky ........... G01S 19/29 |
| | | 342/357.31 |
| 2007/0052583 A1 | 3/2007 | Zhodzishsky et al. |

FOREIGN PATENT DOCUMENTS

CN    103616700    3/2014

OTHER PUBLICATIONS

Kaplan, Elliott D., et. al., "Understanding GPS Principles and Applications", 2006, 2nd ed., pp. 155-160 (Year: 2006).*
Search Report in PCT/RU2017/000816, dated Jul. 17, 2018.

* cited by examiner

*Primary Examiner* — Cassi J Galt
(74) *Attorney, Agent, or Firm* — Bardmesser Law Group

(57) ABSTRACT

A GNSS receiver includes an antenna receiving GNSS signals from a plurality of GNSS satellites; a plurality of channels, each channel processing a single GNSS signal from a single GNSS satellite, and outputting a pseudo-phase of a signal carrier frequency of the single GNSS signal; a block for solving the navigation task based on the pseudo-phases of multiple GNSS signals; each channel including a detector of shadowing of the corresponding GNSS signal; each channel including a weight calculator specifying a relative weight of the single GNSS signal in solving of the navigation task; and each channel including a circuit for recovering a tracking of the shadowed GNSS signal once the shadowing ends. The recovering includes generating guiding indications that enable reducing a time to re-acquire the shadowed GNSS signal.

24 Claims, 4 Drawing Sheets

(51) Int. Cl.
*G01S 19/21* (2010.01)
*G01S 19/22* (2010.01)

SHADOW RECOVERY OF A SINGLE SATELLITE SIGNAL IN A GNSS RECEIVER

CROSS REFERENCE TO RELATED APPLICATIONS

This is a US National Phase of PCT/RU2017/000816, filed on Nov. 2, 2017, incorporated herein by reference in its entirety.

BACKGROUND OF THE INVENTION

Navigation receiver receives signals from many satellites at the same time. The satellite signal carrier is modulated by a pseudo-random (PR-code). In addition, such codes are inversely modulated by binary information symbols. In GPS and GLONASS systems the duration of a binary symbol is 20 msec.

A delay of receiving the signals is measured in the receiver. For each satellite, this delay is measured on several scales. There is a relatively rough scale to measure PR-code delay. Moreover, the delay in carrier frequency phase can be measured. Such measurements have a small unambiguity range (equals to carrier frequency period), but provide higher accuracy. Carrier phase measurements are very important in differential navigation, see reference [L1].

The following tracking circuits are used in delay measuring systems: Delay Lock Loop (DLL) to track code delay and Phase Lock Loop (PLL) to track carrier phase. A few individual loops track each satellite.

A single satellite channel may be regarded as a main structural unit, in which delays are measured in one code and one carrier frequency for each satellite.

A diagram in FIG. 1 illustrates a characteristic structure of signal processing in one satellite channel of the navigation receiver.

Satellite signals received by antenna are fed into receiver's analog path (101) where they are converted to the intermediate frequency, filtered and amplified. Then the obtained input mixture of satellite signals with noise is processed in satellite channels. FIG. 1 presents only one satellite channel, since all the channels have a similar structure.

After block (101) the input mixture of the satellite signals and noise is fed to an analog-digital quadrature converter, ADQC, (102) together with in-phase and quadrature harmonic reference signals (line (117)) generated by an NCO block (107) of harmonic reference signals.

In-phase (114) and quadrature (116) components of the input signal are formed at the ADQC outputs (102) and further sent to correlators (104), (108), (135).

Two closed adjusting circuits can be separated in the diagram of FIG. 1. Blocks (108), (109), (110), (111) form a DLL circuit. Blocks (102), (104), (105), (106), (107) form a PLL circuit.

The task of the PLL is to provide synchronization of harmonic reference signals with the carrier of the input signal (after the analog path of the receiver (101)); let us designate tracking error of phase carrier as $\phi$ (in radians).

The task of the DLL is to provide synchronization of code reference signals with the PR-code of the input signal (after the analog path of the receiver (101)); the delay synchronization error is designated as $\tau$ (in seconds).

A quadrature component of the input signal (116) and a PLL code reference signal (128) generated by the NCO of code reference signals (111) are correlated in the PLL correlator (104).

As a result, a quadrature correlation signal Q (119) is formed in the correlator (104).

As a result of correlation of in-phase component of the input signal (114) and PLL code reference signal (128) generated by the NCO of code reference signals (111), an in-phase correlation signal I(129) is formed in the main correlator (135).

The PLL discriminator (105) generates PLL error signal (121) according to the algorithm $Z_{PLL}^{d}=\arctan(Q/I)$.

An error signal $Z_{PLL}^{d}$ (121) is fed to the loop filter (106) that outputs the PLL control signal (123), adds it to a constant signal of the pedestal frequency (144), and closes the PLL circuit thereby controlling a phase of the harmonic reference signals (117).

The DLL code reference signal (124) is a sequence corresponding to similarly-shaped strobes (short rectangular pulses) located at the ends of PR-code elements of the input signal. This reference sequence is shifted in time relative to the PR-code of the input signal under the influence of the DLL control signal (122), affecting the NCO of code reference signals (111).

As a result of correlation of in-phase component of the input signal (114) and the DLL code reference signal (124), a correlation signal dI (118) is formed in the DLL correlator (108). The magnitude and sign of this signal depend on a shift $\tau$.

The correlation signal dI (118) is fed to DLL discriminator (109). There, it is normalized by dividing by the in-phase correlation signal I (129) produced in the main correlator (135). As a result, the DLL error signal (120) is generated according to the expression: $Z_{PLL}^{d}=dI/I$.

Normalization by dividing by I can eliminate the impact of information symbols which inversely modulate PR-code of the input signal (for some systems, this operation is made separately), as well as compensates for possible changes in amplitude of the input signal.

The error signal $Z_{DLL}^{d}$ (120) is fed to the loop filter (110) that outputs the DLL control signal (122). This signal (122), through the NCO of code reference signals (111), closes the DLL circuit by the DLL code reference signal (124).

The DLL is often guided by the PLL. In this case, the corresponding guiding signal is sent from the PLL to block (111), see FIG. 9.1 in section 9.2 of reference [L1].

The PLL code reference signal (128) is synchronized in time with the DLL code reference signal (124).

Numbers from the registers of loop filters (106) and (110), via outputs (127) and (137), correspondingly, are read and processed further in block (132); pseudo-phase (PP, the term full phase is synonymous) and pseudo-range (PR) are calculated on their basis for the given satellite channel.

The obtained PP and PR of each satellite channel are fed to the inputs of block (134), which solves the navigation task on their basis and outputs coordinates (141), velocities (142), and phase local coordinates (PLC) (143) of the receiver.

To have control circuits of the DLL and the PLL of each satellite channel locked onto the signal, a frequency and time delay searching system is used. A time delay searching system sets an initial delay of code reference signals of the DLL (124) and the PLL (128), which is the closest to the PR-code delay of the input signal (once the input signal is processed by the receiver's analog path (101)). A frequency searching system sets an initial harmonic reference carrier frequency with an error not exceeding the PLL lock-in band.

During operation, tracking losses in the DLLs and the PLLs are quite possible. They can be caused by short-term signal fading from the satellite due to shadowing of the receiving antenna by a local object. Such a phenomenon is normally detected by a special auxiliary device based on correlation signals I and Q, which is a calculation block of satellite signal energy potential, see reference [P2].

When shadowing is detected, usually the search systems have to be turned on again to provide locking and recover a tracking mode. It certainly needs additional time.

Most often, within visibility of the navigation receiver there are a lot of satellites, and loss of one of them does not substantially affect the quality of positioning data. Therefore, the positioning mode is not, in practice, interrupted.

But the situation can be completely different if, when in motion, in a short amount of time, the signal from the second satellite, then from the third and so on, can be interrupted (be shadowed). When the satellite constellation is gradually reduced, the accuracy worsens until anomalous measurements with large errors appear. To prevent this from happening, the constellation needs to be recovered in time by returning the lost satellite, which should be included in solving the navigation task.

Motion in harsh conditions with frequent appearing and disappearing satellite signals causes a peculiar environment, a kind of "competition", between the frequency of interfering external effects (blocking measurements of some satellites for a relatively short time) and the velocity of recovering tracking mode of the newly rising satellites. If the first impact is forced to be considered random and independent from the developer, the second one—speeding up of locking onto a newly rising satellite—is a technical problem whose solution can considerably increase positioning quality. It is important to solve this problem in particular for driving in urban conditions or in forested areas, where shadowing and repeated satellite risings permanently follow each other.

After the satellite signal has been locked again, the generated full phase for this satellite will contain a new unknown number of cycles (ambiguity), which results in the necessity (in RTK mode) of resolving ambiguities anew. The present invention therefore proposes to avoid this problem.

SUMMARY OF THE INVENTION

Accordingly, the present invention is related to a shadow recovery method of a single GNSS satellite signal that substantially obviates one or more of the disadvantages of the related art.

In one aspect, there is a provided a GNSS receiver that includes an antenna receiving GNSS signals from a plurality of GNSS satellites; a plurality of channels, each channel processing a single GNSS signal from a single GNSS satellite, and outputting a pseudo-phase of a signal carrier frequency of the single GNSS signal; a block for solving the navigation task based on the pseudo-phases of multiple GNSS signals; each channel including a detector of shadowing of the corresponding GNSS signal; each channel including a weight calculator specifying a relative weight of the single GNSS signal in solving of the navigation task; and each channel including a circuit for recovering a tracking of the shadowed GNSS signal once the shadowing ends. The recovering includes generating guiding indications that enable reducing a time to re-acquire the shadowed GNSS signal.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF EMBODIMENTS OF THE INVENTION

Figure 1:
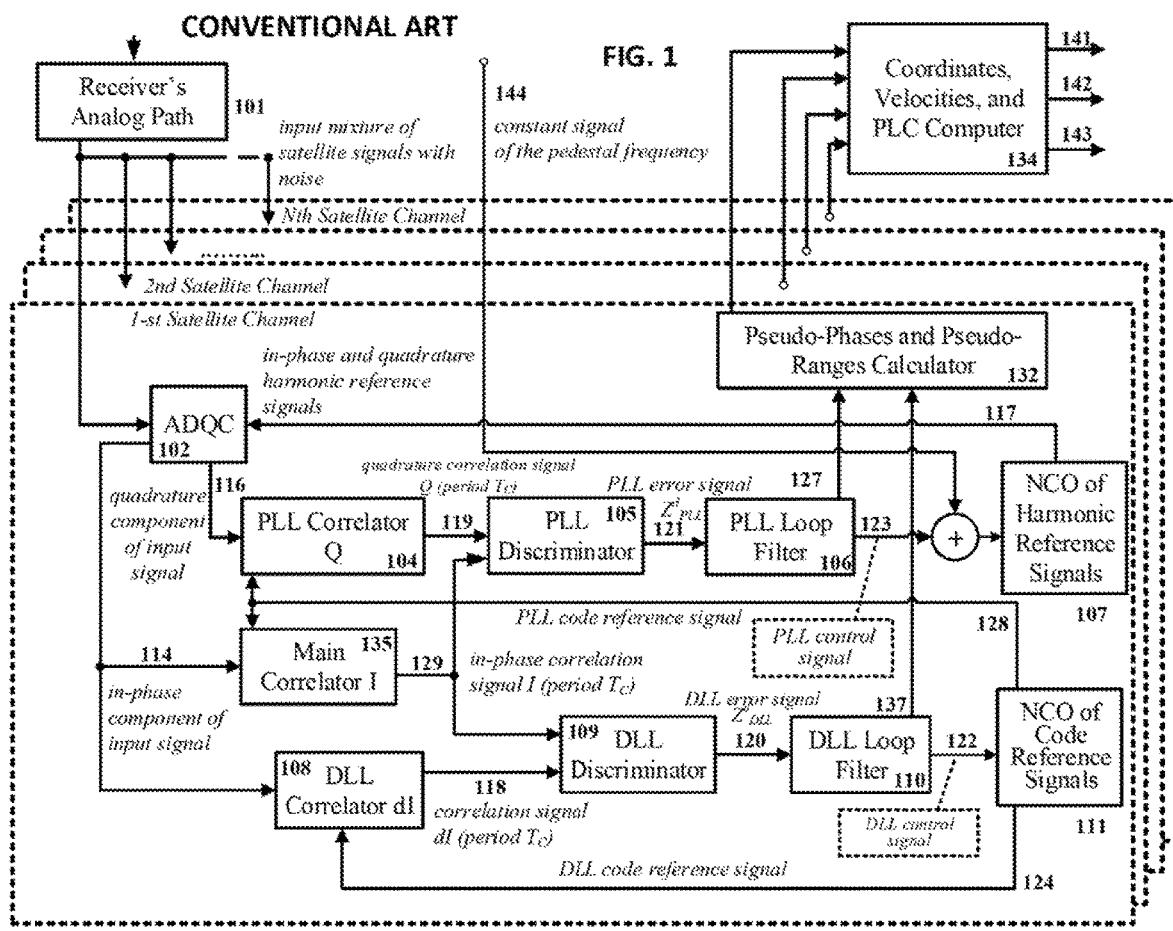
FIG. 1 illustrates a GNSS receiver.

Reference will now be made in detail to the preferred embodiments of the present invention, examples of which are illustrated in the accompanying drawings.

Definitions and Terms in Solving the Navigation Task

To further describe the invention, the following terms and definitions are used.

First, the terms "navigation task" and its solution need to be defined. Navigation task (NT) is the determination of location (coordinates) and rover's moving velocity. This task is solved at the stage of secondary processing by processing raw data—a rover's pseudo-ranges (PR) and the rover's pseudo-phases (PP), as well as on the basis of ephemeris information—in stand-alone mode. For differential mode, differential corrections from the base or base's PR and PP transmitted from the base (as well as base coordinates) are necessary. In a general case, as a rule, absolute coordinates are employed—either Cartesian geometric coordinates with its origin in the Earth center, or plane (geographic) coordinates (latitude, longitude, height), whose origin and determination are well-known.

For special cases, either the coordinate origin or measurement technique is additionally specified. Thus the following terms are used: "topocentric", "local" or "extended" coordinates, the origin of which is separately assigned for each specific case; or "code", or "phase" coordinates which refer to the nature of the radio signal used for the observables.

U.S. Pat. No. 7,522,099 (reference [P1]) discloses a method of determining rover's relative position, including calculation of coordinate increments over an epoch according to measured increments of pseudo-phases, and then—addition of increments to obtain phase local coordinates (PLC).

The PLC determine the rover's position in the coordinate system whose origin is at a point where the rover has been at the initial moment of the adding. If these coordinates are known, PLC can be re-calculated in any required coordinate system. Such measurements are very useful for certain tasks with a high degree of accuracy.

To estimate PR and PP, the following values are calculated and used in each j-th channel:

Current pseudo-phase for the j-th channel: $\phi_i^j$ (in rad);

Current NCO frequency for the j-th channel: $\omega_i^{NCO,j}$ (in rad/s);

Current frequency derivative estimate (in time) of the input signal;

Pedestal frequency $\omega_p^j = 2\pi \cdot f_p^j$ (in rad/s) is equal to the nominal of the latest intermediate frequency (frequency at the input of the ADQC (102)) at zero-Doppler shift ("nominal value" means the intermediate frequency without instability of the board reference and receiver reference);

Pseudo-Doppler frequency $\omega_i^{Doppler,j}$ (in rad/s) calculated according to $\omega_i^{Doppler,j} = \omega_i^{NCO,j} - \omega_p^j$ (note that for GPS this frequency $\omega_p^j = \omega_p$ is the same for all satellites, and for GLONASS each satellite has its own frequency $\omega_p^j$).

Calculation of PLC when there is No Satellite Signal Shadowing

It is assumed in the present application that at the beginning of operation, the system with individual PLLs in each satellite channel is in a standard mode. This means that the stage of signal searching and locking has been completed on time, all PLLs and DLLs track satellite channels, and the number of received signals is at least four.

PLL circuits are often third order and have noise bandwidth $B^{PLL} = 25$ Hz.

Figure 2:
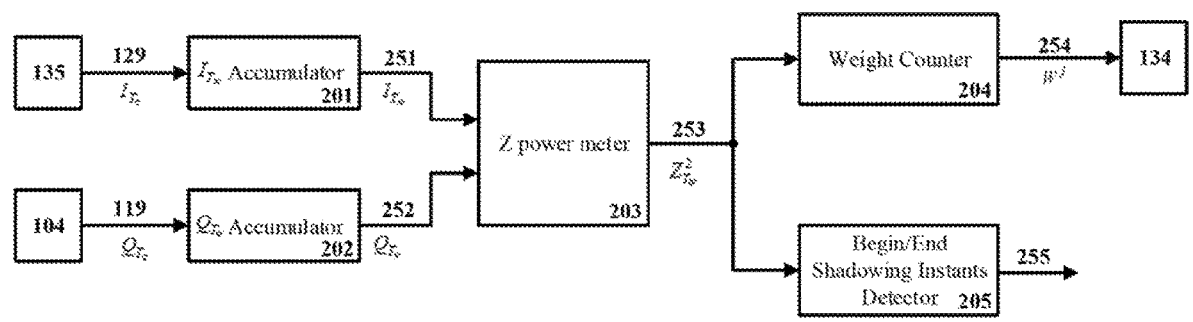
FIG. 2 illustrates the use of a shadowing tracking detector.

The following periods are used for digital processing of received information in the receiver, in particular, in the PLL (for more details, see FIG. 1 and FIG. 2).

With a period $T_C$, correlation signals I and Q are calculated in blocks (135) and (104) and outputted as signals (129) and (119), correspondingly. Let us designate them $I_{T_C}$ and $Q_{T_C}$, respectively, to highlight the period of their generation.

Blocks (105) and (106) operate with the same period $T_C$, and frequency and phase of the NCO block of the harmonic reference signals (107) are controlled at the same period. Thus, the PLL control signal (123) is outputted from block (106) to block (107) at this period.

With a period $T_W$ ($T_W \geq T_C$) equal to the duration of the binary information symbol, correlation signals $I_{T_W}$ and $Q_{T_W}$ are calculated in blocks (201) and (202) by accumulating of correlation signals $I_{T_C}$ and $Q_{T_C}$ over the time Tw; these signals are outputted as (251) and (252), respectively. The accumulation of values $I_{T_W}$ and $Q_{T_W}$ is implemented within limits of binary information symbols.

The number proportional to energy potential is calculated in block "Z power meter" (203) according to the following expression:

$$Z_{T_W}^2 = I_{T_W}^2 + Q_{T_W}^2 \quad (1)$$

In fact, the noise level is the same in all channels, and $Z_{T_W}^2$ can be regarded as the indicator of signal power in each satellite channel. Expression (1) thus is an analog of the signal-to-noise ratio. In the current task, this is enough, since only the relative "weight" of the given satellite signal needs to be evaluated in the used constellation.

With period $T_E \geq T_W$, phase local coordinates are calculated with the least square method (LSM), see chapter 11 in reference [L1]. As known, pseudo-phases are original values at this. The LSM is implemented by multiplying a vector of pseudo-phases increments by matrix $G_i$, where:

$$G_i = (H^T W_i H)^{-1} H^T W_i, \quad (2)$$

here H is the matrix of directional cosines supplemented by the unit column. The required weight diagonal matrix $W_i$ in expression (2) (i is the number of time readings with the period $T_E$) specifying in this task the relative weight of the signal for the given satellite can be calculated according to:

$$W_i^j = \min_{[(i-1)T_E; iT_E]} Z_{T_W}^2. \quad (3)$$

Here, j is the number of diagonal element corresponding to the j-th satellite; and weight $W_i^j$ is calculated for the time instant of $t = t_i = iT_E$. Respectively, the time interval $[(i-1)T_E; iT_E]$ is the just-completed time interval with duration of $T_E$. To do this, interval $T_E$ is divided into several intervals Tw, and the magnitude $Z_{T_W}^2$ is calculated for each such interval in block (203) according to (1), and the minimal of magnitudes is taken as weight $W_i^j$ (in block (204)). This value is outputted with period $T_E$ at output (254) to block (134).

Figure 3:
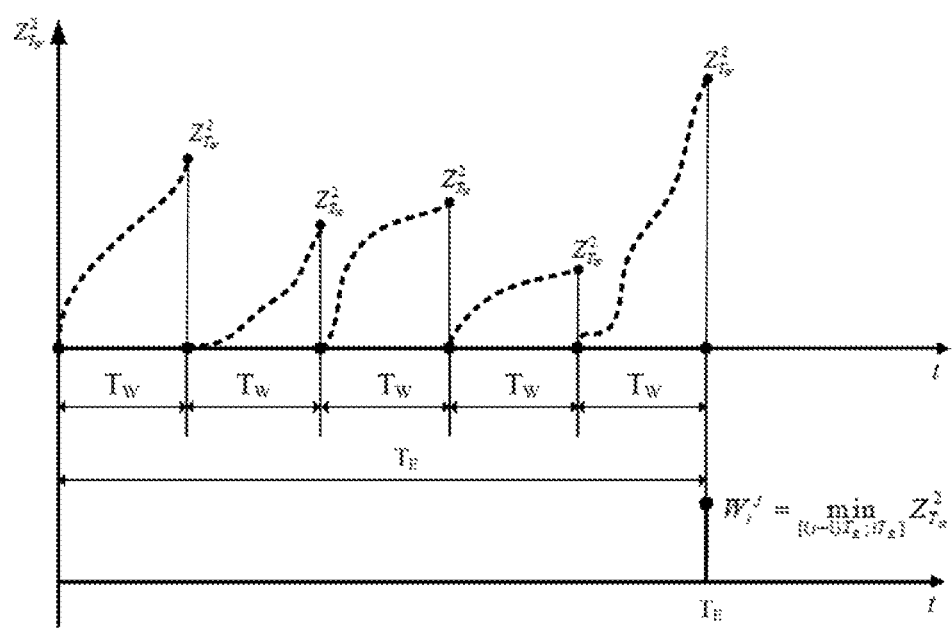
FIG. 3 shows a time interval with a duration of one period $T_E$ in two time axes.

Expression (3) is explained by the graph in FIG. 3.

FIG. 3 shows a time interval with a duration of one period $T_E$ in two time axes. At the end of this period there is weight estimate $W_i^j$ marked at the bottom axis.

Interval $T_E$ is divided into time periods $T_W$ (in FIG. 3 $T_E = 5 \cdot T_W$), and a sum of squares of correlation signals is accumulated within each of the periods. At the end of each period $T_W$, this sum reaches its maximum. The top time axis in FIG. 3 conditionally shows this accumulation process with a non-decreasing slanted line ending with mark $Z_{T_W}^2$. The estimates are consistently compared and the least of them is stored. At the end of interval $T_E$ the least estimate stored for periods $T_W$ remains in the memory. According to the example of FIG. 3, this estimate is within the fourth $T_W$ period and it is outputted as weight $W_i^j$ from expression (3) at the end of the interval $T_E$.

Until shadowing is detected, each channel stores a single value with a period $T_E$—the difference between the current pseudo-phase $\phi_i^j$ (we will designate it $\phi_{BS}^j$ where index "BS" means "beginning of shadow") and a projection of the four-dimension vector of phase local coordinates (in axes x, y, z, q) onto a satellite's line of sight (we will designate a four-dimensional $PLC_{BS}$, and projection—as $PLC_{BS}^{proj,j}$). This value will be needed when shadowing of the j-th satellite is detected.

Detection of Begin/End Shadowing Instants at the Input of a Satellite Channel

Shadowing in a separate channel often does not last long, for example, in some seconds or even in tens of the seconds the satellite signal re-appears at the receiver's input and phase increments are measured again. But longer shadowing are also possible. Nevertheless, even short shadowing can cause noticeable errors in solving the navigation task.

The proposed method allows improving positioning quality in difficult conditions by speeding up the process of locking onto the satellite signal that can disappear and re-appear during operation.

To speed up locking onto the signal, it is suggested that initial tracking conditions should be prepared in advance using redundancy in observed satellites.

First, the fact that a signal at the channel input is shadowed needs to be timely detected. A detector in each channel serves this purpose, working almost continuously with a period $T_W$. Such a detector (block (205) in FIG. 2) is built based on a power indicator $Z_{T_W}^2$ (expression (1), signal line (253) in FIG. 2), by comparing its output with a pre-set threshold (let us designate it Threshold):

$$Z_{T_W}^2 < \text{Threshold}. \quad (4)$$

Figure 4:
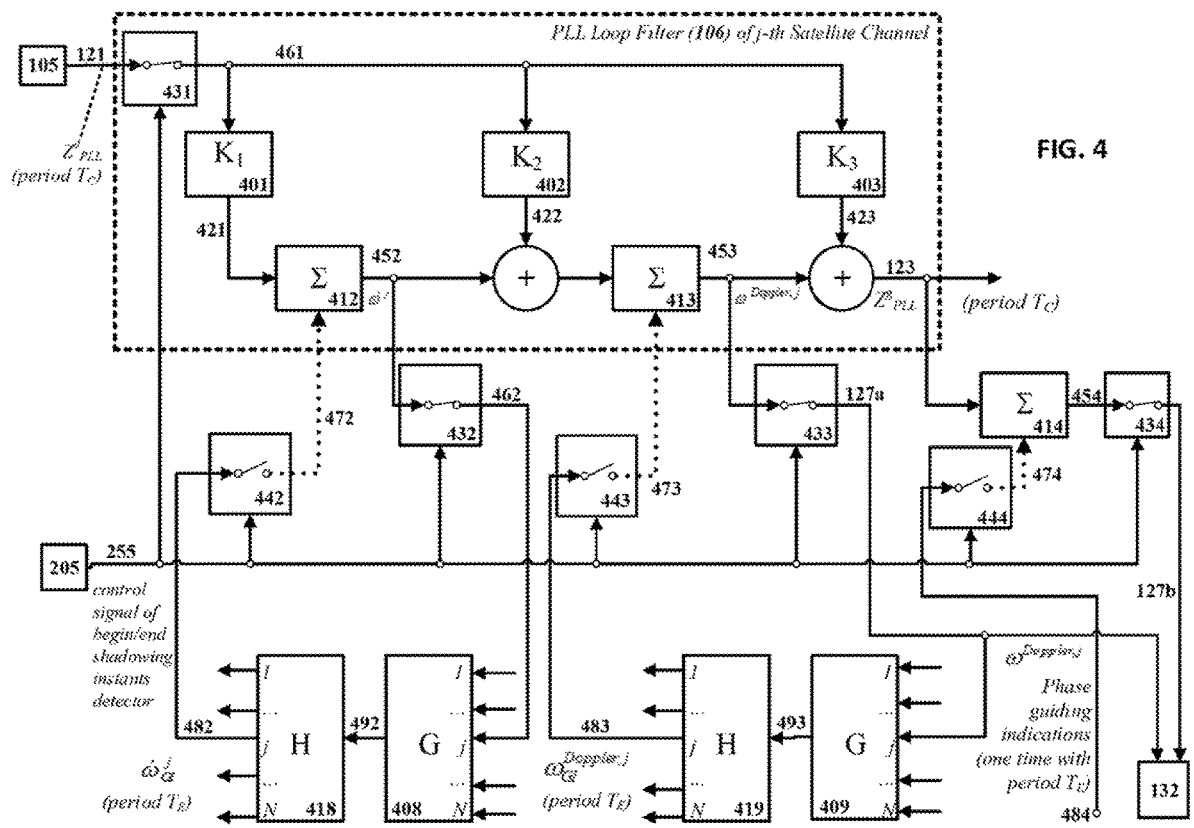
FIG. 4 illustrates modifications made to the loop filter.

When condition (4) is satisfied, this marks the beginning of signal shadowing. When condition (4) is satisfied, block (205) at line (255) outputs a control signal which (see FIG. 4) affects blocks (431), (442), (432), (443), (433), (444) and (434). FIG. 4 shows a situation when shadowing is not detected, and at line (255) there is no control signal from block (205). If signal (255) is available, all the mentioned blocks (431), (442), (432), (443), (433), (444) and (434) inversely change their status (closed keys become disconnected, and open keys—closed).

As long as condition (4) is satisfied in the j-th channel, the PLL circuit is "disconnected": in response to the control signal (255), the key (431) becomes disconnected. The PLL error signal (121) stops being transmitted to the PLL loop filter (106) (see FIG. 1 and FIG. 4), but at the same time "external" guiding indications from other channels with period $T_E$ start to be fed to block (106) (generation of guiding indications is given below). These guiding indications are directly recorded into registers of accumulators (412), (413), as well as (414) at signal lines (472), (473) and (474), respectively. However, the PLL loop filter (106) still operates on a period $T_C$.

The DLL circuit also becomes disconnected along with PLL circuit: in response to the control signal (255), the DLL error signal (120) stops being fed to the input of block (110).

When the satellite signal reappears, condition (4) inversely changes, which can indicate a signal occurrence. But for more reliable operation, some time $t_{max}$ should pass, and during this time the PLL circuit is still kept disconnected. If over the whole time interval $t_{max}$ (i.e., at each instant with period $T_W$) the condition $Z_{T_W}^2 \geq \text{Threshold}$ is satisfied, the shadowing of j-th satellite signal is considered to be over. If during the time $t_{max}$, condition (4) is met at least once (i.e., at any moment with a period $T_W$), the shadowing is not considered to be over, and the procedure of detection of end shadowing instant is to be repeated.

If the decision on the end of shadowing has been taken, block (205) does not output control signal (255), and keys (431), (442), (432), (443), (433), (444) and (434) move to the state shown in FIG. 4. At the same time, in the DLL circuit, the signal (120) is fed to the input of block (110).

Note that in response to the control signal (255), the keys (433) and (434) are disconnected and thereby the measurements of the j-th "shadowed" channel are eliminated from the solution of the navigation task. In a standard mode, these measurements at signal lines (127a, 127b in FIG. 4) are fed to block (132) from the loop filter (106).

Generation of Guiding Indications

Let us assume that the signal of the j-th satellite has been sharply shadowed. Then the stored value (at the latest time sample with period $T_E$) of the difference between pseudo-phase $\phi_{BS}^j$ of j-th channel and a projection $\text{PLC}_{BS}^{proj,j}$ of the phase local coordinate vector onto the j-th satellite's line-of-sight stops to update and will be used for generating guiding indications (GI).

A frequency guiding indication is outputted during shadowing in j-th channel with a period $T_E$. To calculate this guiding indication, one needs to generate a matrix (for N−1 unshadowed satellites) G*, similar to expression (2) but with smaller dimension 4×(N−1) and multiply it by the calculated vector of pseudo-Doppler frequency $\omega_i^{Doppler}$ for unshadowed satellites. One obtains a four-dimensional vector as a result of the multiplication, which is to be multiplied by the (N×4)-dimension matrix H; so an estimate of pseudo-Doppler frequency for the shadowed j-th satellite will be obtained. Outputting guiding indications in frequency is carried out not only in shadowing, but also in the nearest time interval with period $T_E$ after the shadow ends (i.e., at the same time as the phase guiding indication is done, see below).

Outputting frequency guiding indications can be implemented, for example, as in FIG. 4. If shadowing indication in j-th channel is available, block (205) outputs control signal (255), disconnecting key (433). The signal of pseudo-Doppler frequency in j-th channel (453) is thus not fed to the j-th input of block (409), but pseudo-Doppler signals from unshadowed channels are fed instead. In block (409) the vector of the input signal is multiplied by matrix G from expression (2) (zeroing of the j-th input is mathematically equivalent to multiplying by matrix G* mentioned above). A four-dimensional signal is outputted at the output (493) from block (409) and fed to the input of block (419), where it is multiplied by the matrix H. A calculated signal of the guiding indication $\omega_{GI}^{Doppler,j}$ is outputted at the j-th output of block (419), which further passes closed key (443) along signal line (483), and then through signal line (473) will be recorded into the register of the accumulator (413), the stored value in (413) recorded by this moment is overwritten by the new GI. Note that block (419) also outputs GI for all the rest unshadowed channels, but, due to the disconnected keys in these unshadowed channels signals (483), will not affect accumulators (413). Furthermore, the same algorithm of outputting GI is suitable for the case of shadow detecting in some channels: in each "shadowed" channel key (443) will be closed, and in each "shadowed" channel, the GI signals (483) will cause an update of the accumulators (413).

At the same time, as frequency guiding indications are outputted for the j-th satellite with the period $T_E$, additional guidings in frequency derivative of the input signal are also outputted. The procedure of calculation is the same as that of frequency guiding calculation.

The embodiment of outputting GI in frequency derivatives is also given in FIG. 4 and repeats in fact that of outputting frequency GI. Signals of frequency derivatives are fed from "unshadowed" channels (keys (432) are closed) via lines (462) to the inputs of block (408), where they are multiplied by the same matrix G, thereby resulting in a four-component vector (492) which is fed to the input of block (418). Block (418) implements the multiplication by matrix H, and a frequency derivative GI signal for the j-th "shadowed" channel is outputted at the j-th output and further via signal line (482) gets to a closed key (442) and then is stored into a register of the accumulator (412) via signal line (472). The remarks on the rest "shadowed" and "unshadowed" channels (see above) remain valid.

When shadowing is over (taking $t_{max}$ into account), at the closest i-th time sample with the period $T_E$, phase guiding indications are calculated and outputted. To compute phase GI, a 4-dimensional vector $\text{PLC}_i$ is calculated without measurements from j-th satellite. The guiding in phase is determined according to:

$$\phi_i^j = (\phi_{BS}^j - \text{PLC}_{BS}^{proj,j}) + \text{PLC}_i^{proj,j}, \quad (5)$$

where $\text{PLC}_i^{proj,j}$ is the projection of phase local coordinates at i-th time instant onto the j-th satellite's line of sight, and $(\phi_{BS}^j - \text{PLC}_{BS}^{proj,j})$ is the stored difference before shadowing (see above).

FIG. 4 presents an embodiment of outputting phase guiding indications. A phase GI calculated according to expression (5) is fed from (484) to the input of the closed key (444)

(it was closed when shadowing was detected) and further, via signal line (474), is stored in a register of the accumulator (414), thereby correcting its value. When shadowing in the j-th channel is over, and the key (434) becomes closed, an actual pseudo-phase value will be fed to block (132) through the signal line (127b).

Magnitudes $\phi^j$, $f_p^j$ and projections of phase local coordinates onto satellite's line of sight $PLC^{proj,j}$ must have corresponding dimensions (e.g., $\phi^j$ and $PLC^{proj,j}$ are measured in cycles, and $f_p^j$ is measured in Hz).

At the next time sample with period $T_C$ (after the i-th time sample with period $T_E$), the PLL circuit in j-th channel is closed, i.e., the key (431) is closed, and the PLL error signal (121) is provided to the PLL loop filter (106), while "external" guiding indications stop being provided to block (106).

As will be appreciated by one of ordinary skill in the art, the various blocks shown in FIGS. 1, 2 and 4 can be implemented as discrete hardware components, as an ASIC (or multiple ASICs), as an FPGA, as either discrete analog or digital components, and/or as software running on a processor. One of the advantages of the invention is a reduction in the time needed to reacquire the shadowed GNSS signal. Conventional receivers usually take about 1.5-2 seconds to reacquire. With the proposed approach, the time to reacquire, once the shadowing ends, can be reduced to about 0.1-0.2 seconds.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

REFERENCES

P1. U.S. Pat. No. 7,522,099 B2, Position Determination Using Carrier Phase Measurements of satellite Signals, Zhodzishsky, Mark I; Veitsel, V. A., Zinoviev, A.
P2. U.S. Pat. No. 8,368,593 B2, Measurement of Energy Potential (Signal-to-Noise Ratio) in Digital Global Navigation Satellite Systems Receivers, Zhodzishsky, M. I.; Veitsel, V. A.; Beloglazov, V. V; Veitsel, A. V.; Yudanov, S. B.
P3. U.S. Pat. No. 7,222,035, Method and Apparatus for determining changing signal frequency, Zhodzishsky, Mark I.; Yudanov, Sergey; Prasolov, Victor A.; Veitsel, Victor A.
L1. A. D. Boriskin, A. V. Veitsel, V. A. Veitsel, M. I. Zhodzishsky, D. S. Milyutin, *High-precision GNSS positioning equipment; Receivers-consumers of navigation information*, published by MAI-Print (2010)

What is claimed is:

1. A GNSS receiver, comprising:
an antenna receiving GNSS signals from a plurality of GNSS satellites;
a plurality of channels, each channel processing a single GNSS signal from a single GNSS satellite and producing phase synchronization between a reference signal and the single GNSS signal, and outputting a pseudo-phase of a signal carrier frequency of the single GNSS signal,
wherein all the channels are mutually independent of each other when receiving the GNSS signal;
a processor calculating position based on the pseudo-phases of multiple GNSS signals;
each channel detecting a shadowing of the corresponding GNSS signal;
each shadowed channel using a first group of guiding indications to detect an end of the shadowing when a measure of satellite signal power Z2Tw in the shadowed channel is above a predefined threshold, wherein the first group of guiding indications is based on pseudo-Doppler frequencies from channels that receive the GNSS signals; and
each channel including a circuit for recovering a tracking of a reappeared GNSS signal once the shadowing ends, wherein, in each shadowed channel, the recovering includes generating a phase guiding indication based on phase local coordinates, wherein the phase guiding indication corresponds to an integer number of wavelengths to the GNSS satellite of that shadowed channel.

2. The GNSS receiver of claim 1, wherein the processor further calculates velocity of the GNSS receiver.

3. The GNSS receiver of claim 1, wherein, for the detection of the shadowing and recovering the signal tracking, each channel uses the measure of satellite signal power $Z_{T_W}^2$ calculated as a sum of squares of correlation signals $I_{T_W}$ and $Q_{T_W}$, wherein the in-phase correlation signal $I_{T_W}$ is calculated by accumulation of an in-phase correlation signal $I_{T_C}$ of the GNSS signal of the channel over a time period $T_W$, and the quadrature correlation signal $Q_{T_W}$ is calculated by accumulation of a quadrature correlation signal $Q_{T_C}$ of the GNSS signal of the channel over a time period $T_W$.

4. The GNSS receiver of claim 3, wherein a detection of a moment of beginning of shadowing is marked at time intervals with the period $T_W$, when the measure of satellite signal power $Z_{T_W}^2$ is below the predefined threshold.

5. The GNSS receiver of claim 3, wherein, each channel includes a Phase Locked Loop and a PLL switch for disconnecting the Phase Locked Loop, and wherein at a moment of shadowing detection, the Phase Locked Loop is disconnected using the PLL switch and generation of the first group of guiding indications is turned on in the corresponding channel.

6. The GNSS receiver of claim 5, wherein the disconnection of the Phase Locked Loop means that a Numerically Controlled Oscillator of harmonic reference signals for this channel is controlled only by the first group of guiding indications.

7. The GNSS receiver of claim 5, wherein a closing of the Phase Locked Loop means that a Phase Locked Loop error signal of the channel is fed to an input of the Phase Locked Loop filter of this channel, and a Numerically Controlled Oscillator of harmonic reference signals in this channel is controlled based on the Phase Locked Loop error signal.

8. The GNSS receiver of claim 3, wherein, each channel includes a Delay Locked Loop and a DLL switch for disconnecting the Delay Locked Loop, and wherein at the time moment of shadowing detection, the Delay Locked Loop is disconnected using the DLL switch in the corresponding satellite channel.

9. The GNSS receiver of claim 8, wherein the disconnection of the Delay Locked Loop means that an error signal of the Delay Locked Loop of this channel stops to be fed to an input of a Delay Locked Loop filter of this channel.

10. The GNSS receiver of claim 3, wherein each channel includes a Numerically Controlled Oscillator of harmonic reference signals, and wherein, when the measure of satellite signal power $Z_{T_W}^2$ remains below the predefined threshold, the Numerically Controlled Oscillator in a channel of a shadowed satellite signal is controlled through a block that generates a pseudo-Doppler frequency of the channel and a pseudo-Doppler frequency derivative of the channel, based on first group of guiding indications from other channels that receive the GNSS signals.

11. The GNSS receiver of claim 3, wherein after the measure of satellite signal power $Z_{T_W}^2$ exceeds the predefined threshold, and remains larger than the predefined threshold for a time $t_{max}$, at every time moment with a period $T_W$, the end of shadowing is indicated, the first and second groups of guiding indications for recovery of the GNSS signal tracking after shadowing are generated once at a nearest time moment with a period $T_E$, and at a next time moment with a period $T_C$ a Phase Locked Loop is closed using a PLL switch and a Delay Locked Loop of the shadowed channel is closed using a DLL switch.

12. The GNSS receiver of claim 11, wherein $t_{max}$ is $t_{max}$=20 ms.

13. The GNSS receiver of claim 3, wherein the processor creates a set of discrete time moments for the following periods:
a period $T_C$ for generation of in-phase ($I_{T_C}$) and quadrature ($Q_{T_C}$) correlation signals from the GNSS signal in each satellite channel for control of a Phase Locked Loop and a Delay Locked Loop in each satellite channel,
a period $T_W$ for determining an interval of accumulating the measure of satellite signal power $Z_{T_W}^2$ for each satellite channel, and
a period $T_E$ for calculating the position.

14. The GNSS receiver of claim 13, wherein the periods have the following values:
$T_C$=5 ms, $T_W$=20 ms, $T_E$=100 ms.

15. The GNSS receiver of claim 1, wherein each channel further computes a relative weight of the single GNSS signal, wherein the relative weight of the single GNSS signal is computed as a minimal value of the measure of satellite signal power $Z_{T_W}^2$ over a time $T_E$.

16. The GNSS receiver of claim 15, wherein the processor uses a least squares method (LSM) that multiplies a vector of pseudo-phases increments by a matrix G, where $G=(H^T W_t H)^{-1} H^T W_t$, with the matrix H being a matrix of directional cosines supplemented by a unit column and the matrix W is a diagonal matrix with the relative weights of each tracked GNSS signal on a diagonal.

17. The GNSS receiver of claim 1, wherein, in the shadowed channels, the receiver:
calculates a pseudo-phase for the reappeared GNSS satellite signal based on pseudo-phases of unshadowed GNSS satellite signals once the shadowing ends;
calculates a pseudo-Doppler frequency for the shadowed GNSS satellite signal regularly with a period $T_E$, based on pseudo-Doppler frequencies of the unshadowed satellite signals;
calculates a pseudo-Doppler frequency for the reappeared GNSS satellite signal at a nearest time moment with the period $T_E$ taken once the shadowing ends;
calculates a pseudo-Doppler frequency derivative for the shadowed GNSS satellite signal, regularly with the period $T_E$, based on pseudo-Doppler frequency derivatives of the unshadowed satellite signals; and
calculates the pseudo-Doppler frequency derivative for the reappeared GNSS satellite signal at the nearest time moment with the period $T_E$ taken once the shadowing ends,
wherein the pseudo-Doppler frequency derivative is also used to calculate the first group of guiding indications.

18. The GNSS receiver of claim 17, wherein the receiver calculates the pseudo-Doppler frequency for the shadowed GNSS satellite signal by applying a least squares method to a vector of pseudo-Doppler frequencies of unshadowed satellite signals with further projection onto the satellite's line of sight.

19. The GNSS receiver of claim 17, wherein the pseudo-Doppler frequency for the shadowed GNSS satellite signal is written to a frequency accumulation register of a PLL loop filter.

20. The GNSS receiver of claim 17, wherein the pseudo-Doppler frequency derivative for the shadowed GNSS satellite signal is calculated by applying a least squares method to a vector of pseudo-Doppler frequency derivatives of unshadowed satellite signals with further projection onto a satellite's line of sight.

21. The GNSS receiver of claim 17, wherein the pseudo-Doppler frequency derivative for the shadowed GNSS satellite signal is written to a frequency derivative accumulating register of a PLL loop filter.

22. The GNSS receiver of claim 17, wherein the receiver also calculates a pseudo-phase for the reappeared GNSS satellite signal as a sum of a pseudo-phase value stored in a memory just before the shadowing and a projection of a phase local coordinates augmentation onto the satellite's line of sight,
wherein the phase local coordinates augmentation is a difference between phase local coordinate vectors computed just before the shadowing and just after the shadowing ends.

23. A GNSS receiver, comprising:
an antenna receiving GNSS signals from a plurality of GNSS satellites;
a plurality of channels, each channel processing a single GNSS signal from a single GNSS satellite and producing phase synchronization between a reference signal and the single GNSS signal, and outputting a pseudo-phase of a signal carrier frequency of the single GNSS signal,
wherein all the channels are mutually independent of each other when receiving the GNSS signal;
a processor calculating position based on the pseudo-phases of multiple GNSS signals;
each channel detecting a shadowing of the corresponding GNSS signal;
each shadowed channel using guiding indications to detect an end of the shadowing when satellite signal power in the shadowed channel is above a predefined threshold, wherein the measure of satellite signal power calculated as a sum of squares of in-phase and quadrature correlation signals, and wherein the guiding indications are based on pseudo-Doppler frequencies from channels that receive the GNSS signals; and
each channel including a circuit for recovering a reappeared GNSS signal once the shadowing ends.

24. The receiver of claim 23, wherein, in each shadowed channel, the recovering includes generating a phase guiding indication based on phase local coordinates, wherein the phase guiding indication corresponds to an integer number of wavelengths to the GNSS satellite of that shadowed channel.

* * * * *